Aug. 3, 1937.　　　　H. L. HULL　　　　2,088,654
POSITION CONTROL SYSTEM
Filed Feb. 16, 1935　　　2 Sheets—Sheet 1
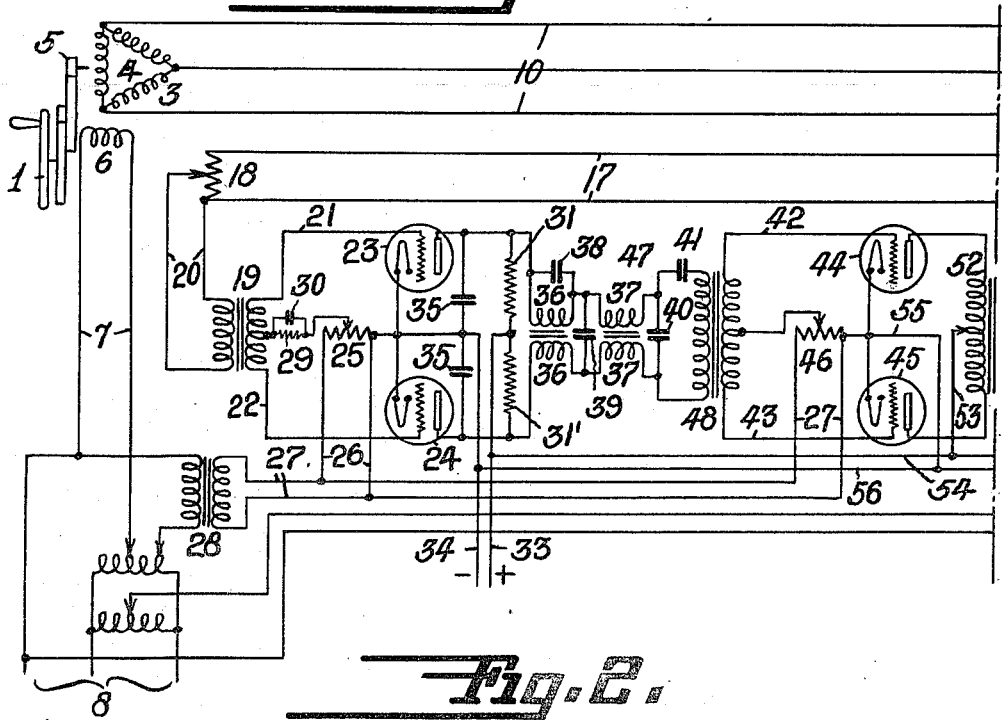
INVENTOR
HARVARD L. HULL
Herbert H. Thompson
HIS ATTORNEY.

Aug. 3, 1937.  H. L. HULL  2,088,654
POSITION CONTROL SYSTEM
Filed Feb. 16, 1935   2 Sheets-Sheet 2

INVENTOR
HARVARD L. HULL
BY
Herbert H. Thompson
HIS ATTORNEY.

Patented Aug. 3, 1937

2,088,654

UNITED STATES PATENT OFFICE 2,088,654

POSITION CONTROL SYSTEM

Harvard L. Hull, Leonia, N. J., assignor to Sperry Gyroscope Company, Inc., Brooklyn, N. Y., a corporation of New York Application February 16, 1935, Serial No. 6,917

15 Claims. (Cl. 172—239)

This invention relates, generally, to control systems, and the invention has reference, more particularly, to a novel position control system wherein a controlling object is arranged to operate through suitable electrically operable means to cause a controlled object to move into positional agreement with the controlling object.

Systems of this character as heretofore constructed have generally been more or less unsatisfactory in use for various reasons, among which may be mentioned the following: firstly, the tendency of the controlled object, due to its inertia and that of its connected parts, including the driving motor, to overrun the position of correspondence with the controlling object, resulting in the tendency of the driven object to "hunt", i. e., to oscillate back and forth about the position of correspondence; secondly, the tendency of the controlled object to lag or fall angularly behind the controlling object due commonly to inherent deficiencies of the system, thereby rendering the system unsatisfactory for many important uses, such as ship gun control, where it is essential that there be no appreciable time lag in the system in order that motion of the ship shall not adversely affect the accuracy of fire at long range; and thirdly, the tendency of the controlled object to come to rest somewhat out of positional agreement with the controlling object, thereby rendering the system useless where accuracy is desired or essential.

In a number of these systems heretofore used, the relative angular displacement of the controlling object with respect to the controlled object is employed to set up an alternating current signal potential whose magnitude is substantially proportional to the said angular displacement $\theta$ of the controlling object with respect to the controlled object. This signal potential is applied to the input circuit of a thermionic amplifier having an output circuit in which a power motor for driving the controlled object is connected. The power motor is thusly supplied with an operating current varying substantially in proportion to the angular displacement of the controlling object with respect to the controlled object, whereby the torque developed by this motor depends only on the relative angular displacement of the two objects and may be expressed approximately as follows:

$$L = K(\theta)$$

where L is the motor torque, K designates a constant, and $\theta$ the angle of displacement.

In the absence of friction and of any initial displacement and/or velocity, the torque necessary to accelerate a controlled rotatable object is proportional, theoretically, to a constant I, the moment of inertia of the object about its axis of rotation, and to the angular acceleration of the object, and may be expressed as follows:

$$L = I\frac{d^2\theta}{dt^2}$$

wherein the angular acceleration is the second derivative of the angular displacement with respect to time.

However, all corporeal bodies may have initial displacements and velocities and hence, when dealing with such bodies, these additional factors, if of sufficient magnitude to be considered, can be corrected for by suitable damping means so that the torque equation then becomes:

$$L = k\theta + k'\frac{d\theta}{dt} + k''\frac{d^2\theta}{dt^2}$$

wherein $k$, $k'$ and $k''$ are constants and the angular velocity is the first derivative of the angular displacement $\theta$ with respect to time.

However, experience has shown that in continuous control systems the second derivative is most important and for practical purposes the above equation becomes:

$$L = k\theta + k''\frac{d^2\theta}{dt^2}$$

It will be quite apparent, therefore, that in those systems where the torque of the power motor driving the controlled object is a function merely of the relative angular displacement, and not of time derivatives thereof, true synchronism of the controlling and controlled objects can hardly be obtained.

In one or more of the systems heretofore used, the power motor driving the controlled object has been furnished with an additional current over and above that proportional to the relative angular displacement of the objects, which additional current is proportional approximately to the rate of change of the displacement angle with respect to time, i. e., angular velocity, but in these systems also, a lack of synchronism and sensitivity is observed in use due essentially to the failure of the system to take cognizance of the acceleration with which the controlling object is moved and which the controlled object should repeat if substantially true synchronism is to be obtained.

The principal object of the present invention is to provide a novel position control system that overcomes the above recited defects of previous systems, the said novel system being so constructed and arranged as to cause the controlled object to move in substantial synchronism with the controlling object regardless of the mass of the controlled object and its associated parts, whereby time lag between the controlling and controlled objects is largely eliminated and extremely accurate positional agreement of these objects is obtained at all times, regardless of the acceleration or direction of movement of the controlling object. Another object of the present invention lies in the provision of a novel position control system of the above character wherein the motive means for controlling the motion of the controlled object is not only operated in response to the change in the relative angular position of the controlling and controlled objects, i. e., to the relative angular displacement of the controlling object with respect to the controlled object, but in addition this motive means is largely operated in response to the second derivative of this angular displacement with respect to time, i. e., to the acceleration and deceleration of the controlling object with respect to the controlled object, whereby the motion of the controlling object is anticipated and the controlled object actuated accordingly, so that this object is substantially maintained in correspondence with the controlling object regardless of variations in acceleration or direction of movement of the latter or of the inertia of the former.

Still another object of the present invention is to provide a novel position control system of the above character that employs a phase detector and rectifier for detecting the phase of the angular displacement signal voltage received from the controlling object means and simultaneously rectifying such signal voltage, which voltage, after filtering, is applied to a condenser and primary of a transformer in series, whereby, should the rate of voltage increase or decrease change, a voltage proportional to the acceleration or deceleration of the controlling object is induced in the transformer secondary, which induced voltage is applied to a balanced modulator, the output of which is thereafter added as a correction to the displacement signal voltage controlling the power motive means actuating the controlled object, whereby the torque applied to the controlled object is resopnsive to the acceleration of the controlling object with respect to the controlled object, as is desired.

Other objects and advantages wil become apparent from the specification, taken in connection with the accompanying drawings wherein the invention is embodied in concrete form.

In the drawings,

Fig. 1 is a part of a wiring diagram illustrating an embodiment of the novel position control system of this invention.

Fig. 2 is the remaining part of the wiring diagram of Fig. 1.

Similar characters of reference are employed in the above views to designate corresponding parts.

Figure 3:
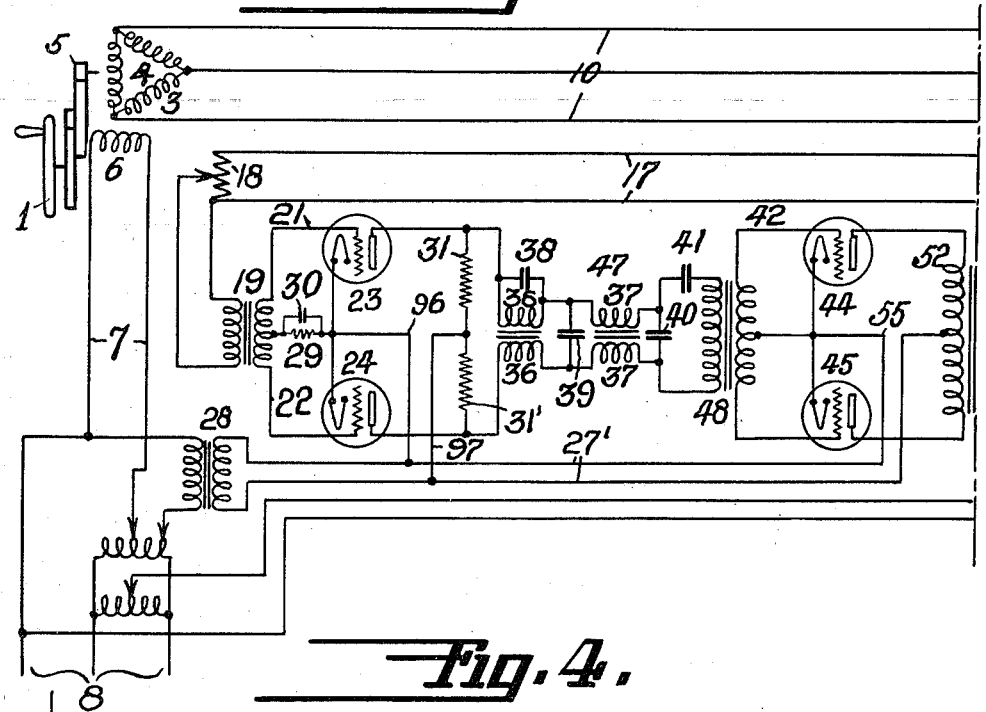
Fig. 3 is a part of a wiring diagram illustrating another embodiment of the novel position control system of this invention.

Referring now to Figs. 1 and 2 of the said drawings, the controlling object I is illustrated as a handwheel, although the same might be any other manually turnable object, such as a telescope, the angular motion of which is to be accurately and immediately repeated by the searchlight 2 or other controlled object through the operation of the novel position control system of this invention. A transmitter 3 has its polyphase rotor 4 mechanically connected through speed reduction gearing 5 to the handwheel 1. Transmitter 3 is of a well known type and has its stator winding 6 excited with alternating current by leads 7 connected to a suitable source of alternating voltage, represented by the three phase supply lines 8. The rotor 4 is in inductive relation to the stator 6 and its three windings are so wound that the alternating current in winding 6 produces in rotor 4 an alternating magnetic field having a position in space determined by the relative position of winding 4 with respect to winding 6.

Any rotation of the transmitter rotor 4 caused by angular movement of the handwheel I produces a corresponding angular shifting of the axis of the magnetic field in rotor 9 of a receiver 13. Rotor 9 is electrically connected to rotor 4 by leads 10 and is mechanically connected to the rotor of a repulsion motor 14 that drives the searchlight 2 through reduction gearing 15. During such unbalanced condition, the pulsating field of rotor 9 will induce an alternating electromotive force in the receiver stator winding 11, the value of which is substantially proportional to the angular displacement between the handwheel I and searchlight 2. When the stator 11 is at right angles to the field of rotor 9, the voltage induced in stator 11 is zero, and when this stator is parallel to the field of rotor 9, i. e., in the same position in space, a maximum voltage is induced in stator 11.

The terminals of stator 11 are connected by leads 17 to a potentiometer 18, and a transformer 19 has its primary winding connected by leads 20 to the potentiometer 18 and to one of the leads 17. The secondary winding of transformer 19 has its terminals connected by leads 21 and 22 to the grids of three-electrode phase detector tubes 23 and 24 arranged in opposition, whereby any alternating signal voltage supplied from the receiver 13 is impressed on the grids of tubes 23 and 24 in 180° out of phase relation. An alternating potential in phase with the signal potential is introduced into the input circuits of tubes 23 and 24 by a potentiometer 25 that has its terminals connected by leads 26 to supply leads 27, which in turn are connected to the secondary of a transformer 28 having its primary supplied from the source 8. One side of potentiometer 25 is connected to the cathodes of tubes 23 and 24, whereas the tap of this potentiometer is connected through a resistance 29 to the center tap of the secondary of transformer 19, the resistance 29 being shunted by a small condenser 30. Resistance 29 and condenser 30 aid in preventing overloading tubes 23 and 24. This resistance 29 and condenser 30 may be omitted if desired.

The alternating potential furnished from potentiometer 25 is supplied to the grids of tubes 23 and 24 in in-phase relation, so that any signal voltage received from the receiver 13 is additive to this alternating potential at one of the grids and subtractive at the other, with the result that a current will flow in the output circuit of one of these tubes, depending upon the phase relation of the signal, i. e., upon whether the handwheel I is being turned in one direction or the other.

The anodes of tubes 23 and 24 are supplied with positive potential from a suitable direct current source by means of a lead 33, resistances 31 and 31' being respectively connected between lead 33 and the respective anodes of tubes 23 and 24. The negative lead 34 of the direct current source is connected to the cathodes of the tubes 23 and 24. Condensers 35 are connected between the anodes and cathodes of the tubes 23 and 24.

The anodes of tubes 23 and 24 are connected to inductively related choke coils 36, that in turn are connected in series with additional inductively related choke coils 37. A condenser 38 is connected across one of the choke coils 36, whereas condensers 39 and 40 are connected between the outer terminals of coils 36 and 37. Choke coils 36 and 37 and condensers 38, 39 and 40 constitute a filter 47 for filtering the output of tubes 23 and 24, thereby smoothing out the ripples therein and applying the same as a unidirectional E. M. F. to a condenser 41 and the primary of a transformer 48 connected in series. Condensers 35 aid in filtering the output of tubes 23 and 24.

The condenser 41 and transformer 48 serve as an acceleration or second derivative detector, for as long as the E. M. F. supplied from the filter 47 is constant, corresponding to a constant displacement angle, or uniformly increasing, corresponding to a uniformly increasing displacement angle, i. e., uniform velocity, then no potential will be induced in the secondary of transformer 48, but as soon as the E. M. F. output of the filter increases or decreases with acceleration, an E. M. F. will be induced in the secondary of transformer 48, which E. M. F. is proportional to the accelerated or decelerated signal. This will be apparent when it is noted that as long as the unidirectional or D. C. E. M. F. supplied from filter 47 is constant, corresponding to a constant relative displacement angle, the condenser 41 is fully charged to an equal voltage and there is no current flowing into it, and hence there is no current in the primary of transformer 48 so there is no induced voltage in the secondary of this transformer. Also, if the D. C. E. M. F. supplied from filter 47 is uniformly increasing or decreasing corresponding to a uniformly increasing or decreasing displacement angle, i. e., uniform velocity, the condenser 41 is being charged or discharged, as the case may be, at a steady rate so that the current flowing into or out of it is constant, and therefore constant current flows in the primary of transformer 48 so there is no induced voltage in the secondary of this transformer. On the other hand, if the D. C. E. M. F. output of the filter has a changing rate of increase or decrease, i. e., increases or decreases with acceleration, the condenser 41 is being charged or discharged at an increasing rate and the current through the primary of transformer 48 is increasing or decreasing, as the case may be, so that this changing primary current induces a voltage in the secondary of transformer 48.

The terminals of the secondary winding of transformer 48 are connected by leads 42 and 43 to the grids of three-electrode modulator tubes 44 and 45 arranged in opposition. An alternating potential in phase with the signal voltage is introduced into the input of tubes 44 and 45 by a potentiometer 46 having its terminals connected to supply leads 27. One side of the potentiometer 46 is connected to the cathodes of tubes 44 and 45, whereas the tap of this potentiometer is connected to the center tap of the secondary of transformer 48.

The anodes of tubes 44 and 45 are connected to the respective ends of the primary winding of a transformer 52, the mid tap of this primary winding being connected by leads 53 and 54 to the lead 33 supplying plate voltage. The cathodes of tubes 44 and 45 are connected by leads 55 and 56 to the lead 34 leading to the negative side of the plate voltage source.

The alternating potential furnished from potentiometer 46 is supplied to the grids of modulator tubes 44 and 45 in in-phase relation. The outputs of tubes 44 and 45 are opposed in the transformer 52 so that when there is no voltage appearing across the secondary of transformer 48, there will be no alternating voltage present in the secondary of transformer 52. If, however, a voltage appears across the secondary of transformer 48 due to an acceleration or deceleration, the current passed by tubes 44 and 45 will differ, with the result that an alternating voltage will appear across the secondary of transformer 52. The phase of this voltage will depend on the phase of the original signal which arises from a relative displacement of the objects, and upon whether the relative velocity of the objects is increasing or decreasing with respect to time.

The secondary winding of transformer 52 has one end thereof connected by a lead 57 to one end of the primary winding of a transformer 58, while the other end of this secondary winding is connected through lead 60 and a resistance 62 to the other end of the primary winding of transformer 58. Leads 64 and 65 connect a potentiometer 66 across leads 17 leading to the stator winding 11 of the receiver 13. Lead 64 is connected to the mid tap of the secondary winding of transformer 52, whereas a lead 67 connects the tap of potentiometer 66 to the point of connection of resistance 62 with the primary of transformer 58.

The resistance 62 is of such value as to cooperate with the primary winding of transformer 58 and with the two halves of the secondary winding of transformer 52 to form a bridge, having the displacement signal potential from winding 11 supplied by leads 64 and 67 to points of similar potential of this bridge, whereby such displacement signal potential is additive to the accelerated or correction signal potential induced in the secondary winding of transformer 52, so that the displacement signal potential and a correction potential, depending upon the acceleration or deceleration of this displacement signal potential, are both supplied to the primary winding of transformer 58 and amplified by this transformer. The bridge arrangement prevents any voltage from transformer 52 from being fed back to lines 17.

The ends of the secondary winding of transformer 58 are connected by leads 69 and 70 to the grids of amplifier tubes 71 and 72 arranged in push-pull. A grid biasing resistance 73 is connected between the cathodes of tubes 71 and 72 and the mid tap of the secondary winding of transformer 58. The anodes of tubes 71 and 72 are connected to the respective ends of the primary winding of a transformer 75 having its mid tap connected through a resistance 74 to the cathodes of tubes 71 and 72. Lead 54, connected to the mid tap of the primary of transformer 75, supplies voltage to the plates of tubes 71 and 72, the other side of the plate voltage source being connected to the mid tap of the secondary of transformer 58.

The tubes 71 and 72 amplify the output of transformer 58, which output, as already pointed out, is an amplified summation of the displacement signal potential and the correction signal potential, which latter is proportional to the second time derivative of the displacement signal. It is apparent that when the relative displacement angle θ is being accelerated the correction signal potential is additive, and when this angle is being decelerated the correction is subtractive and may even reverse the phase of the resultant signal supplied by transformer 58 to tubes 71 and 72. Thus, the zero displacement position of the objects is anticipated and any tendency to overrun is eliminated.

The terminals of the secondary winding of transformer 75 are connected by leads 77 and 78 through condensers 76 and 76' to the grids of grid controlled rectifier tubes 79 and 80. As is well known by persons skilled in the art, the average value of the current flowing in the anode circuit of tubes 79 and 80 can be varied by varying the phase relationship between the voltages applied to the grids and to the anodes, respectively. Alternating voltage is supplied to the grids of the pair of grid controlled rectifier tubes 79 and 80 by means of a transformer 82 supplied from the alternating current leads 3 through leads 83. One end of the secondary of transformer 82 is connected by lead 84, resistances 85 and 86, and leads 77 and 78 to the grids of tubes 79 and 80, whereas the other end of the secondary of transformer 82 is connected by lead 87 to the cathodes of tubes 79 and 80 and to the windings 88' and 93' of motor control transformers 88 and 93. The phase of the voltages supplied to the grids of tubes 79 and 80 are so adjusted that, in the absence of a signal potential, only a small stand-by current flows in the output circuit of tubes 79 and 80. Condensers 89 and 90 and resistances 91 and 92 improve the operation of the grid controlled rectifier tubes 79 and 80.

One pair of brushes of the repulsion motor 14 are connected across the winding 88" of transformer 88, whereas the other pair of brushes of this motor are connected across the winding 93" of transformer 93. The field winding 94 of this motor is supplied with A. C. An alternating potential is thus induced in the rotor of this motor and hence potentials appear across the brushes of this rotor which are applied to the transformer windings 88" and 93". Hence, when the tube 79 is rendered conducting, the winding 88" of transformer 88 is shorted, in effect, and motor 14 operates in one direction, whereas when the tube 80 is rendered conducting, the winding 93" of transformer 93 is shorted, in effect, and motor 14 operates in the opposite direction, the speed of operation of the motor depending upon the magnitude of current flowing in the tube output circuit.

As long as the controlling object 1 is not displaced with respect to the controlled object or searchlight 2, no signal potential is supplied to the grids of the grid controlled rectifier tubes 79 and 80, but as soon as the handwheel 1 starts to turn, the combined displacement and second derivative potentials, amplified by transformer 75, are impressed on the grid of one of the tubes 79 or 80, depending on the direction of rotation of the handwheel 1, thereby shifting the phase of the resultant voltage supplied to this grid and causing current to flow in the output circuit of such tube, resulting in the rotation of power motor 14 in the direction necessary to synchronize the controlling and controlled objects. The phase and magnitude of the amplified signal potential determines the torque and speed of motor 14. During acceleration of the handwheel 1, the displacement signal is increased by the second derivative signal to give added torque to motor 14, whereas during deceleration the displacement signal is reduced or even reversed to give a less or reversed torque, respectively. Hence, in stopping, the motor 14 is actually thrown into reverse a sufficient time before the stopping position is reached to arrest its motion and hence, with proper adjustment of the parts, substantial synchronism of the controlling and controlled objects is obtained and without overshooting of the stopping position.

Figure 4:
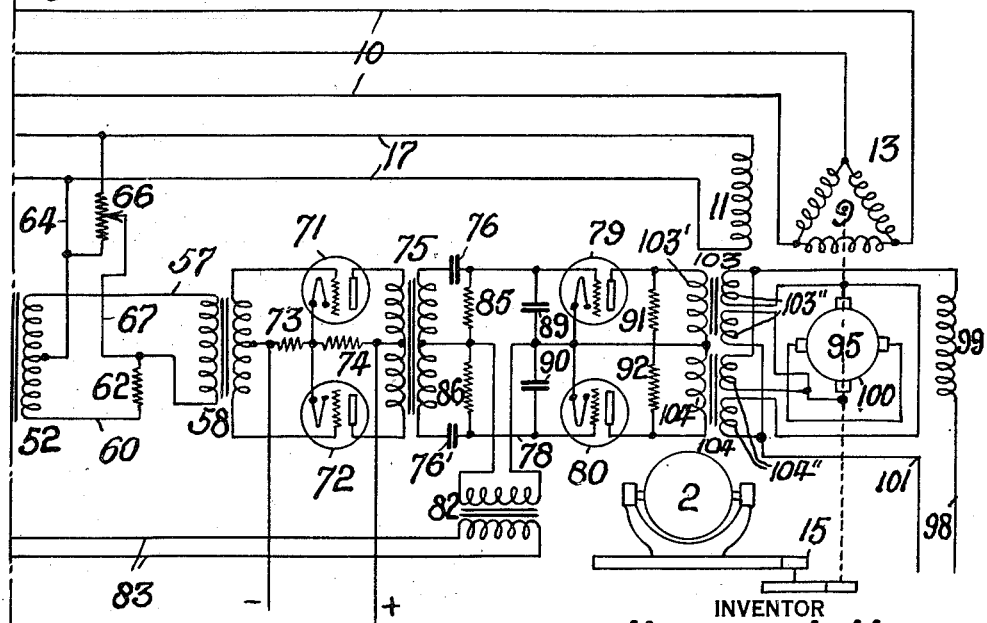
Fig. 4 is the remaining part of the wiring diagram of Fig. 3.

The embodiment of the invention shown in Figs. 3 and 4 is similar to that shown in the preceding figures and corresponding parts are similarly numbered. In this embodiment, however, the detector tubes 23 and 24 and the modulator tubes 44 and 45 are supplied with an alternating plate potential, as from the transformer 26, and an alternating current series motor 95 is used as the power motor rather than a repulsion motor. Leads 96 and 97 connected to leads 27' from transformer 26, serve to supply alternating potentials to the anodes of tubes 23 and 24. Likewise leads 27' serve to supply alternating potentials to the anodes of tubes 44 and 45.

The transformers 103 and 104 in the output circuits of grid controlled rectifiers 79 and 80 have divided windings 103" and 104". Thus, when tube 79 is operating, A. C. flows through lead 98, series field winding 99, one portion of the transformer winding 103", armature 100, the other portion of the winding 103" of transformer 103, and then through lead 101 to the A. C. supply, the motor 95 operating in one direction. When tube 80 is operating, A. C. flows through lead 98, series field winding 99, one portion of the winding 104" of transformer 104, reversely through motor armature 100, the other portion of the winding 104" of transformer 104, and then through lead 101 to the A. C. supply, the motor 95 operating in the reverse direction.

The operation of the system of Figs. 3 and 4 is similar to that of Figs. 1 and 2 and would appear to require no further description. It will be understood that other types of A. C. motors may be used in lieu of a repulsion or series motor. Owing to the use of the second derivative or acceleration signal potential as well as the displacement signal potential in determining the operation of the power motor 95, the controlled object 2 operates in substantial synchronism with the controlling object 1.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

The word "acceleration" in the following claims is intended to cover both positive acceleration and negative acceleration, or deceleration.

Having described my invention, what I claim and desire to secure by Letters Patent is:

1. A position control system of the character described, comprising a controlling object, a controlled object, means for driving said controlled object, a control circuit for said driving means, said control circuit having means for producing alternating potentials responsive solely to the relative displacement and acceleration of the controlling object with respect to the controlled object for use in controlling the operation of said driving means.

2. A position control system of the character described, comprising a plurality of objects arranged to move in synchronism, synchronizing means interconnecting said objects, said synchronizing means comprising means for producing A. C. potentials responsive solely to the relative displacement and acceleration with which one of said objects tends to depart from synchronism for maintaining said objects in synchronism.

3. A position control system comprising a controlling object, a controlled object, means for driving said controlled object, an electrical circuit for controlling said driving means, said electrical circuit having means for producing an A. C. potential responsive to the relative displacement of said controlling object with respect to said controlled object, and additional means for deriving directly from said displacement potential an A. C. potential responsive to the acceleration and deceleration of said controlling object with respect to the controlled object, said A. C. displacement potential and said A. C. acceleration and deceleration potential being combined in said controlling circuit, and the resultant potential employed for controlling said driving means.

4. A position control system of the character wherein a plurality of objects are arranged to operate in synchronism and wherein a change in the electrical characteristics of said system is produced by departure of one of said objects from synchronism, comprising motive means operable in response to said change for restoring synchronism between said devices, grid controlled rectifier means for controlling the operating energy supplied to said motive means, and series-connected condenser-transformer means responsive to the second derivative of such change with respect to time for supplying control energy to said rectifier means.

5. A position control system of the character described, comprising a plurality of objects arranged to move in synchronism, synchronizing means interconnecting said objects including transmitter-receiver means for producing an A. C. displacement signal voltage responsive to the relative displacement of said objects and acceleration detector means for producing a second A. C. signal voltage responsive to the rate of change with respect to time of velocity of one of said objects with respect to the other, said synchronizing means using said two voltages solely for maintaining said objects in synchronism.

6. In a position control system of the character described, in combination, a plurality of objects arranged to move in synchronism, synchronizing means interconnecting said objects, said synchronizing means comprising means for setting up an alternating signal potential responsive to a departure of said objects from synchronism, means for detecting and rectifying the phase of said signal potential, series connected condenser-transformer means for detecting the second derivative with respect to time of said rectified signal potential, means for adding said second derivative to said signal potential, an amplifier for amplifying said combined potentials, and motive means for restoring synchronism between said objects, said motive means being controlled from said amplifier.

7. In a position control system of the character described, in combination, a plurality of objects arranged to move in synchronism, synchronizing means interconnecting said objects, said synchronizing means comprising means for setting up an alternating signal potential responsive to a departure of said objects from synchronism, means for detecting and rectifying the phase of said signal potential, series connected condenser-transformer means for detecting the second derivative with respect to time of said rectified signal potential, bridge means for adding said second derivative potential to said signal potential, an amplifier for amplifying said combined potentials, motive means for restoring synchronism between said objects, and grid controlled rectifier means for controlling the supply of operating energy to said motive means, said rectifier means being controlled by the output of said amplifier.

8. In a position control system of the character described, in combination, a plurality of objects arranged to move in synchronism, synchronizing means interconnecting said objects, said synchronizing means comprising means for setting up an alternating signal potential responsive to the departure of said objects from synchronism, electron tube detector means for detecting and rectifying the phase of said signal potential, means for filtering said rectified potential, series connected condenser-transformer means for detecting the second derivative with respect to time of said rectified signal potential, bridge means for combining said second derivative potential with said signal potential, means for amplifying said combined potentials, motive means for restoring synchronism between said objects, and grid controlled rectifier means for controlling the supply of operating energy to said motive means, said rectifier means being controlled by the output of said amplifying means.

9. In a position control system of the character described, a controlling object, a controlled object, said objects being capable of relative movement, a source of power operatively associated with said controlled object, an A. C. potential producing means operatively associated with one of said objects, an A. C. potential responsive means operatively associated with the other of said objects, a continuously acting control circuit operatively associated with said potential responsive means, and continuously responsive solely to a predetermined function of relative displacement of said objects and to the second time derivative of said predetermined function and controlling said power source so as to reduce said relative movement, whereby a follow-up action is produced.

10. In a position control system of the character described, a controlling object, a controlled object, said objects being capable of relative movement, a source of power operatively associated with said controlled object, a potential producing means operatively associated with one of said objects, a potential responsive means operatively associated with the other of said objects, a continuously acting control circuit operatively associated with said potential responsive means, said control circuit comprising means for detecting and rectifying the phase of potential derived from said potential producing means, series connected condenser-transformer means for detecting the second derivative with respect to time of said rectified potential, means for adding said second derivative to the potential of said potential producing means, and an amplifier for amplifying said combined potentials, said source of power being controlled from said amplifier.

11. A position control system of the character described, comprising a plurality of objects arranged to move in synchronism, synchronizing means interconnecting said objects, said synchronizing means comprising means for setting up an alternating signal potential responsive to a departure of the objects from synchronism, means for detecting and rectifying the phase of said signal potential, impedance means for detecting the second derivative with respect to time of said rectified signal potential, means for adding said second derivative to said signal potential, an amplifier for amplifying said combined potentials, and motive means for restoring synchronism between said objects, said motive means being controlled from said amplifier.

12. A position control system as defined in claim 11, having modulating means controlled by the rectified potentials from said detecting and rectifying means, said modulating means serving to produce alternating potentials whose amplitude and sense vary with said rectified potentials.

13. A positional control system of the character described, comprising a plurality of objects arranged to move in synchronism, synchronizing means interconnecting said objects, said synchronizing means comprising means for producing a reversible alternating potential responsive to the relative displacement of the objects, means for detecting the magnitude and phase position of said reversible signal potential and for rectifying the same, means for filtering the output of said rectifying means, thereby obtaining a D. C. displacement pulse, means for converting said displacement pulse into a pulse responsive to the relative acceleration of said objects, a balanced modulator for converting said acceleration pulse into an alternating pulse of variable magnitude and reversible phase, means for adding said last named alternating potential to said alternating displacement potential, and means for utilizing said combined alternating potentials for maintaining said objects in synchronism.

14. A positional control system of the character described, comprising a plurality of objects arranged to move in synchronism, synchronizing means interconnecting said objects, said synchronizing means comprising means for producing a reversible alternating signal potential responsive to the relative displacement of the objects, means for detecting the magnitude and phase position of said reversible signal potential and for rectifying the same, means for filtering the output of said rectifying means, thereby obtaining a D. C. displacement pulse, means for converting said displacement pulse into a pulse responsive to the relative acceleration of said objects, a balanced modulator for converting said acceleration pulse into an alternating pulse of variable magnitude and reversible phase, bridge means for adding said last named alternating potential to said alternating displacement potential, an amplifier for amplifying said combined potentials, motive means for restoring synchronism between said objects, and grid controlled rectifying means for controlling the supply of operating energy to said motive means, said rectifier means being controlled by the output of said amplifier.

15. A position control system comprising a controlling object, a controlled object, driving means for said controlled object, a control circuit for said driving means, said control circuit having means for producing but two signals of the A. C. type responsive respectively to the relative displacement of said objects and to the second derivative of such relative displacement with respect to time, and means responsive to said signals for varying the operation of said driving means.

HARVARD L. HULL.